United States Patent
Maekawa

(10) Patent No.: US 6,705,422 B2
(45) Date of Patent: Mar. 16, 2004

(54) ELECTRIC POWER STEERING DEVICE EQUIPPED WITH ANTI-THEFT FUNCTION AND METHOD FOR MANUFACTURING SAME

(75) Inventor: Tomohiro Maekawa, Habikino (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/217,361

(22) Filed: Aug. 12, 2002

(65) Prior Publication Data

US 2003/0042065 A1 Mar. 6, 2003

(30) Foreign Application Priority Data

Aug. 31, 2001 (JP) ........................... 2001-264285

(51) Int. Cl.[7] .................................................. B62D 5/04
(52) U.S. Cl. ......................................................... 180/444
(58) Field of Search ................................. 180/443, 444

(56) References Cited

U.S. PATENT DOCUMENTS 6,041,887 A * 3/2000 Kojo et al. ................. 180/446

* cited by examiner

Primary Examiner—Lesley D. Morris
Assistant Examiner—Matthew Luby
(74) Attorney, Agent, or Firm—Jordan and Hamburg LLP

(57) ABSTRACT

In an electric power steering device equipped with an anti-theft function, a steering shaft is surrounded by a coil inside a sensor housing of a torque sensor. A receiving portion is provided on the outer circumference of an upper shaft which is provided as a separate entity to input and output shafts that are capable of mutual elastic relative rotation. This coil is disposed between the receiving portion and an auxiliary steering power transmitting driven gear which is provided on the outer circumference of the steering shaft. The outer diameters of the receiving portion and the driven gear are larger than the inner diameter of the coil. A lock member is received by the receiving portion, whereby the rotation of the steering shaft is restricted. The sensor housing, coil, input and output shafts, a first magnetic flux transmitting member which is attached to the input shaft, a second magnetic flux transmitting member which is attached to the output shaft, and the driven gear are formed into an assembly, whereupon the upper shaft is connected to the input shaft so as to be capable of rotation in accompaniment therewith.

4 Claims, 6 Drawing Sheets

Prior Art

ELECTRIC POWER STEERING DEVICE EQUIPPED WITH ANTI-THEFT FUNCTION AND METHOD FOR MANUFACTURING SAME

FIELD OF THE INVENTION

The present invention relates to an electric power steering device equipped with an anti-theft function and a method for manufacturing same.

DESCRIPTION OF THE RELATED ART

A conventional electric power steering device 101 equipped with an anti-theft function, which is illustrated in FIG. 6, comprises sensor housing 102 and a steering shaft 103 having a part which is surrounded by this sensor housing 102. A lock member (omitted from the drawings), which is supported by a member fixed to the vehicle body side, is received by a receiving portion 104 provided on the outer circumference of the steering shaft 103 on the exterior of the sensor housing 102. Thereby, the rotation of the steering shaft 103 is restricted to provide an anti-theft function. In this conventional example, a tubular member 109 is integrated with the steering shaft 103 on its outer circumference by press fitting, and the receiving portion 104 is constituted by the inner surface of a recessed portion formed on the tubular member. A torque sensor 105 having a magnetic flux generating coil 108, which is provided so as to surround the steering shaft 103, is provided within the sensor housing 102. This torque sensor 105 has input and output shafts 111, 112 which constitute the steering shaft 103, and which are mutually connected so as to be capable of elastic relative rotation. The torque which is transmitted by the steering shaft 103 is detected on the basis of changes in the relative position in the circumferential direction of a first magnetic flux transmitting member 115 which is attached to the input shaft 111 and a second magnetic flux transmitting member 116 which is attached to the output shaft 112. A driving gear 107 which meshes with a driven gear 106 provided on the outer circumference of the output shaft 112 is driven by an electric actuator (omitted from the drawings), and the auxiliary steering power generated by this electric actuator is transmitted to the steering shaft 103. The coil 108 is disposed in a position between the receiving portion 104 and the driven gear 106, in which the generated magnetic flux is transmitted through the two magnetic flux transmitting members 115, 116. The outer diameter D1 of the receiving portion 104 is made smaller than the inner diameter D3 of the coil 108, and the outer diameter D2 of the driven gear 106 is made larger than the inner diameter D3 of the coil 108. The steering shaft 103 has an upper shaft 113 which is a separate entity to the input and output shafts 111, 112, and the receiving portion 104 is provided on the outer circumference of this upper shaft 113. The upper shaft 113 is connected via a pin 120 to the input shaft 3 so as to be capable of rotation in accompaniment therewith. Further, a tubular column 119 is provided surrounding the upper shaft 113 and disposed in a position which is unchanging with respect to the sensor housing 102.

Conventionally, when manufacturing the aforementioned electric power steering device 101, the input and output shafts 111, 112, the upper shaft 113, the magnetic flux transmitting members 115 and 116, and the driven gear 106 are formed into an assembly, and this assembly is inserted into the sensor housing 102. Since the outer diameter D2 of the driven gear 106 is larger than the inner diameter D3 of the coil 108, the driven gear 106 cannot be passed through the coil 108. Therefore, the assembly is inserted into the sensor housing 102 from the upper shaft 113 side.

When the aforementioned electric power steering device 101 is used in a vehicle in which the outer diameter of the steering shaft 103 is large, the outer diameter D1 of the receiving portion 104 provided on the outer circumference of the steering shaft 103 also becomes large. Moreover, when the receiving portion 104 is mounted onto the steering shaft 103 via a torque limiter, which prevents excessive torque from acting upon the steering wheel, so as to improve the anti-theft function by preventing damage of the receiving portion 104 or the lock member, the outer diameter D1 of the receiving portion 104 becomes even larger. Hence, the outer diameter D1 of the receiving portion 104 becomes larger than the inner diameter D3 of the coil 108. As a result, not only the driven gear 106, but also the receiving portion 104 is unable to pass through the coil 108, and therefore the assembly formed from the input and output shafts 111, 112, the upper shaft 113, the magnetic flux transmitting members 115 and 116, and the driven gear 106 cannot be inserted into the sensor housing 102. Consequently, enlarging the inner diameter D3 of the coil 108 has been considered. However, when the inner diameter D3 of the coil 108 becomes larger, the entire device is increased in size, and problems arise in that the mounting of the steering device on the vehicle becomes difficult and costs increase.

An object of the present invention is to provide an electric power steering device equipped with an anti-theft function and a method for manufacturing same which can solve the aforementioned problems.

SUMMARY OF THE INVENTION

The electric power steering device equipped with an anti-theft function according to the present invention comprises a sensor housing, a steering shaft having a part which is surrounded by this sensor housing, and a torque sensor having a magnetic flux generating coil which is provided within the sensor housing so as to surround the steering shaft. This torque sensor has input and output shafts which constitute the steering shaft, and which are mutually connected so as to be capable of elastic relative rotation. The torque that is transmitted by the steering shaft is detected on the basis of changes in the output of the coil in response to changes in the relative position in the circumferential direction of a first magnetic flux transmitting member which is attached to the input shaft and a second magnetic flux transmitting member which is attached to the output shaft. An auxiliary steering power transmitting driven gear is provided on the outer circumference of the output shaft. The steering shaft has an upper shaft which is provided as a separate entity to the input and output shafts. A receiving portion is provided on the outer circumference of this upper shaft, and the coil is disposed in a position between the receiving portion and the auxiliary steering power transmitting driven gear in which the generated magnetic flux is transmitted through the two magnetic flux transmitting members. A lock member which is supported by a member fixed to the vehicle body side is received by the receiving portion, whereby the rotation of the steering shaft is restricted.

The manufacturing method of the present invention is characterized in that, upon manufacture of the electric power steering device equipped with an anti-theft function, the outer diameter of the receiving portion and the outer diameter of the auxiliary steering power transmitting driven gear are made to be larger than the inner diameter of the coil, and the sensor housing, coil, mutually connected input and output shafts, the two magnetic flux transmitting members and the driven gear are formed into an assembly, whereupon the upper shaft with the receiving portion provided on its outer circumference is connected to the input shaft so as to be capable of rotation in accompaniment therewith.

According to this method of the present invention, the outer diameter of the receiving portion and the outer diameter of the auxiliary steering power transmitting driven gear are made to be larger than the inner diameter of the coil, and hence this method can respond to such cases as when the receiving portion is provided on the outer circumference of a steering shaft with a large outer diameter, or when the receiving portion is mounted onto the steering shaft via a torque limiter in order to improve the anti-theft function. In this case, the sensor housing, coil, input shaft, output shaft, the two magnetic flux transmitting members, and the driven gear are formed into an assembly, whereupon the upper shaft with the receiving portion provided on its outer circumference is connected to the input shaft so as to rotate in accompaniment therewith. Hence, even though both the driven gear and the receiving portion cannot pass through the coil, assembling can be performed without enlarging the inner diameter of the coil.

It is preferable that the two magnetic flux transmitting members are relatively disposed in a given position, whereupon the input shaft and output shaft are connected to each other, and the upper shaft is connected to the input shaft so as to be capable of relative displacement in the axial direction.

In the torque sensor, which detects the torque that is transmitted by the steering shaft on the basis of changes in the output of the coil in response to changes in the relative position in the circumferential direction of the first magnetic flux transmitting member and second magnetic flux transmitting member, a detection reference value to detect torque is the output of the coil when torque is zero. The absolute value of this detection reference value varies in accordance with the relative position in the axial direction of the first magnetic flux transmitting member and second magnetic flux transmitting member. Thus, by adjusting the relative position in the axial direction of the input shaft to which the first magnetic flux transmitting member is attached and the output shaft to which the second magnetic flux transmitting member is attached, the relative position in the axial direction of the two magnetic flux transmitting members is adjusted such that the output of the coil when torque is zero becomes the detection reference value. By connecting the input shaft and output shaft to each other following this adjustment, the two magnetic flux transmitting members can be relatively disposed in a given position in which the coil output becomes the reference value. If excessive force acts upon the connecting portion between the input shaft and the output shaft, the relative disposition of the two magnetic flux transmitting members fluctuates, whereby the torque detection accuracy deteriorates. Thus, by making the upper shaft capable of displacement in the axial direction relative to the input shaft, excessive force can be prevented from acting upon the connecting portion of the input and output shafts. Excessive force can also be prevented from acting upon the connecting portion of the input and output shafts when a column, which surrounds the upper shaft and which is disposed in an unchanging position with respect to the sensor housing, is connected to the upper shaft so as to be capable of accompanying displacement in the axial direction.

The electric power steering device equipped with an anti-theft function of the present invention is characterized in that the outer diameter of the receiving portion and the outer diameter of the auxiliary steering power transmitting driven gear are made to be larger than the inner diameter of the coil, and the upper shaft is connected to the input shaft so as to be capable of accompanying rotation and relative displacement in the axial direction.

The electric power steering device equipped with an anti-theft function of the present invention can be manufactured according to the method of the present invention.

According to the present invention, an improvement in the mounting characteristic to the vehicle, a reduction in costs, and an improvement in the anti-theft function can be effected without enlarging the coil of the torque sensor which detects steering torque, and further, an electric power steering device equipped with an anti-theft function, which is capable of preventing a deterioration in the torque detection accuracy, and a method of manufacturing same can be provided.

DESCRIPTION OF THE PREFERRED EMBODIMENT

Figure 1:
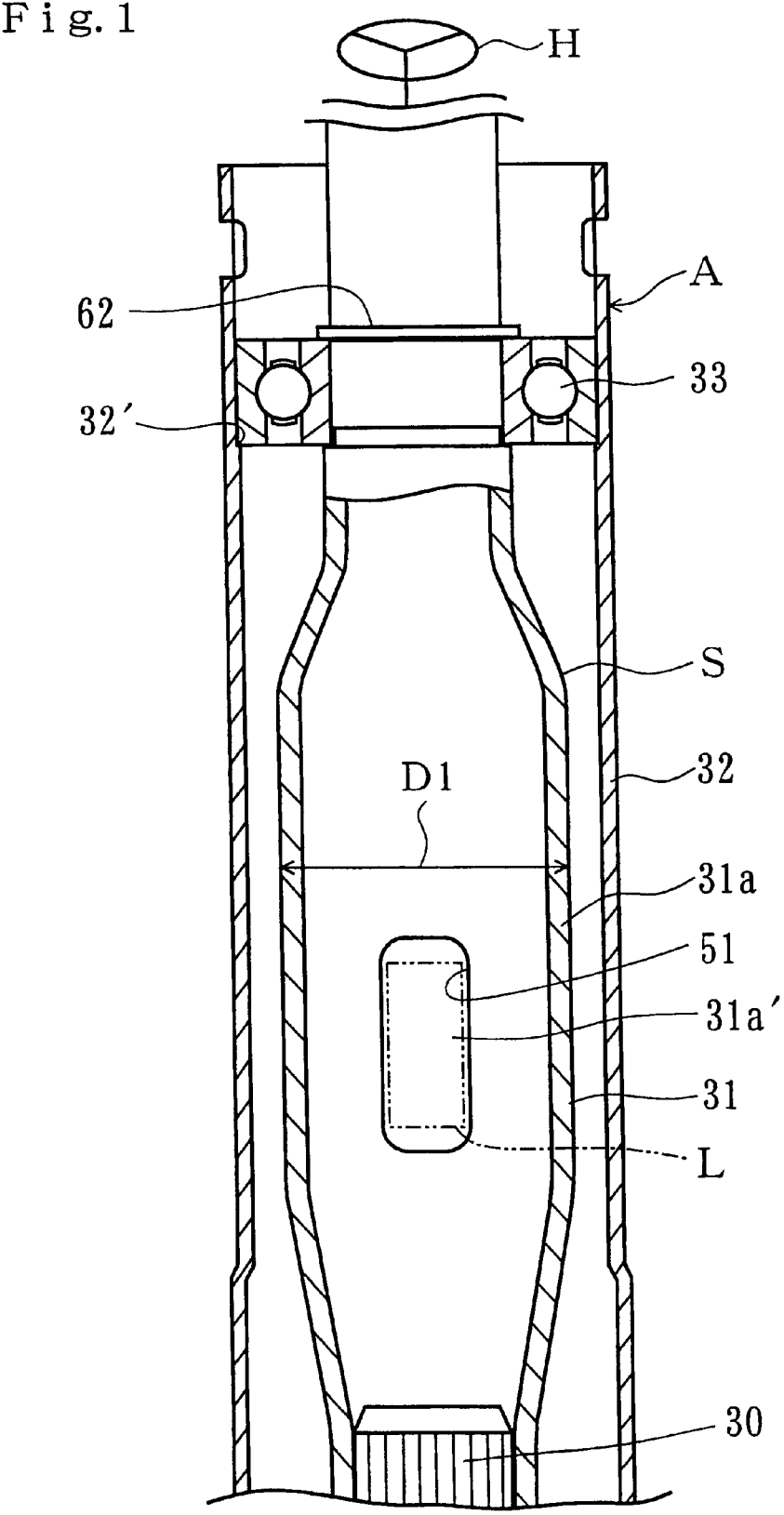
FIG. 1 is a cross-sectional view adjacent to the steering wheel of the electric power steering device of a first embodiment of the present invention.
Figure 2:
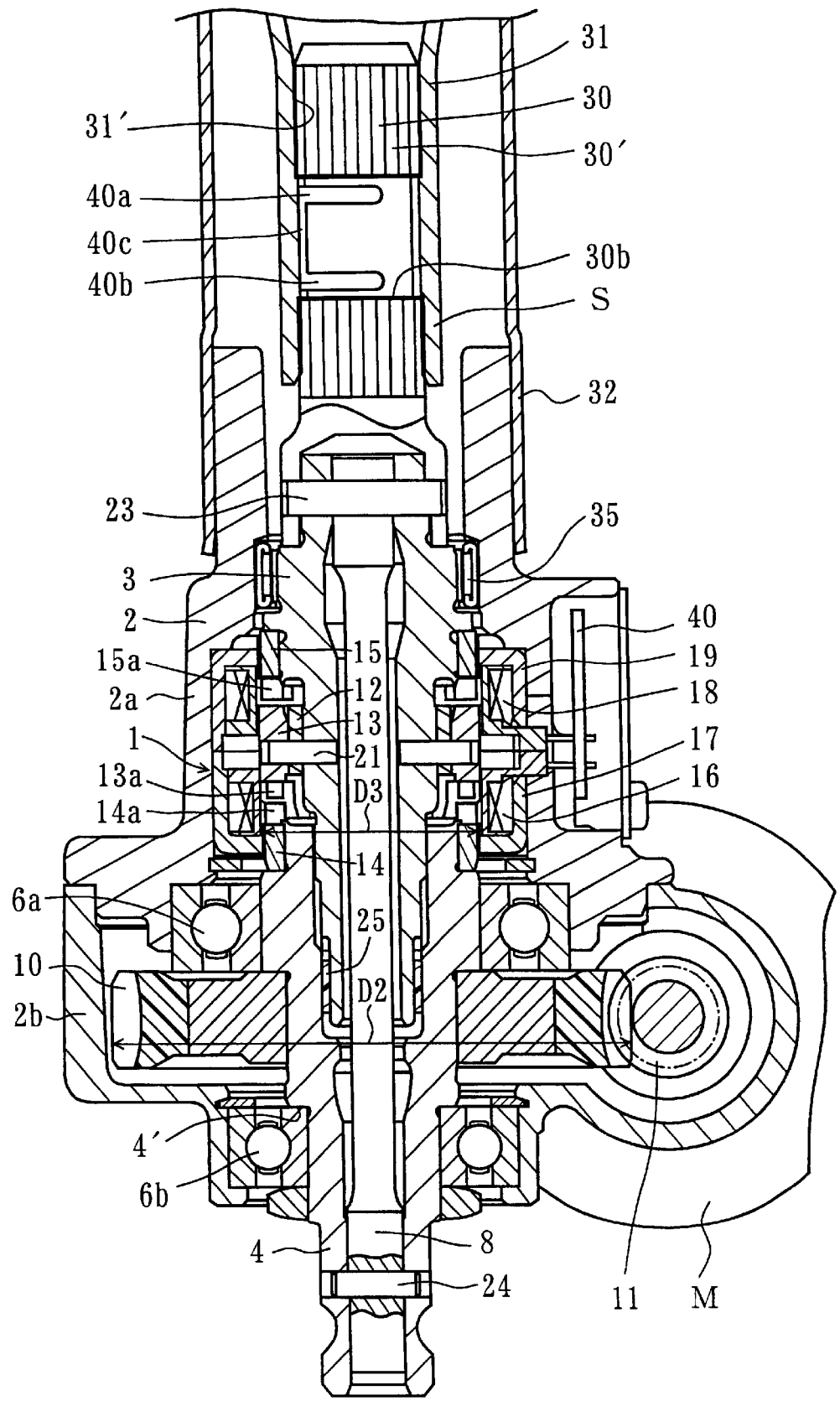
FIG. 2 is a cross-sectional view adjacent to the vehicle wheel of the electric power steering device of a first embodiment of the present invention.

The electric power steering device (A) equipped with an anti-theft function of a first embodiment, which is illustrated in FIGS. 1 and 2, transmits steering torque generated by the steering operation of a steering wheel (H) from a steering shaft (S) to vehicle wheels via a universal joint and a steering gear (not shown) in such a manner that the steering angle is varied. There are no limitations upon the type of the steering gear as long as it can transmit steering torque from the steering shaft (S) to the vehicle wheels such that the steering angle is varied. For example, a rack and pinion type steering gear can be employed in which the movement of a rack, which meshes with a pinion that rotates due to steering torque, is transmitted to the vehicle wheels via tie rods, knuckle arms, or the like.

A torque sensor 1 for detecting the steering torque transmitted by the steering shaft (S) is provided. This torque sensor 1 is provided with a sensor housing 2 which is fixed to the vehicle body, and input and output shafts 3 and 4 which are surrounded by the sensor housing 2 and which are mutually connected so as to be capable of elastic relative rotation. The input and output shafts 3 and 4 constitute the aforementioned steering shaft (S). The steering shaft (S) further has an upper shaft 31 and an intermediate shaft 30, which are provided as separate entities to the input and output shafts 3 and 4. The upper shaft 31 is tubular, the steering wheel (H) is connected to one end thereof, and the intermediate shaft 30 is connected via serrations 31' and 30' to the other end thereof so as to be capable of accompanying rotation and relative displacement in the axial direction. The intermediate shaft 30 is connected to the input shaft 3 by means of a pin 23. The aforementioned universal joint is connected to the other end of the output shaft 4. In other words, the steering shaft (S) has a part which is surrounded by the sensor housing 2, and the upper shaft 31 is connected to the input shaft 3 on the exterior of the sensor housing 2 so as to be capable of accompanying rotation and relative displacement in the axial direction. In this embodiment, a peripheral groove 30*b* is formed so as to be sandwiched between the area of formation of the serration 30' on the outer circumference of the intermediate shaft 30. A pair of arc-shaped leaf springs 40*a* and 40*b* are fitted over this peripheral groove 30*b*, and the two leaf springs 40*a* and 40*b* are connected by a connecting member 40*c*. When the intermediate shaft 30 is inserted into the upper shaft 31 via the serrations 31' and 30', the leaf springs 40*a* and 40*b* are pressed into the inner circumference of the upper shaft 31 by elastic force. By means of this elastic force, relative backlash between the upper shaft 31 and the intermediate shaft 30 can be prevented.

In this embodiment, the sensor housing 2 is constructed by connecting a second housing 2*b* to a first housing 2*a* disposed near to the steering wheel (H) via bolts (not shown). The input shaft 3 is rotatably supported by the first housing 2*a* via a needle bearing 35. The output shaft 4 is rotatably supported by the first housing 2*a* via a ball bearing 6*a*, and rotatably supported by the second housing 2*b* via a ball bearing 6*b*. The input shaft 3 and output shaft 4 are tubular. One end side of the input shaft 3 is inserted through a bush 25 into a center hole in the output shaft 4 so as to allow relative rotation.

A torsion bar 8 is inserted as an elastic member into the center hole in the input shaft 3 and output shaft 4. One end of this torsion bar 8 is connected to the input shaft 3 and the intermediate shaft 30 by means of the aforementioned pin 23, and the other end is connected to the output shaft 4 by a pin 24. As a result, the input shaft 3 and the output shaft 4 become capable of elastic relative rotation about the shaft center axis in response to the steering torque.

Figure 3:
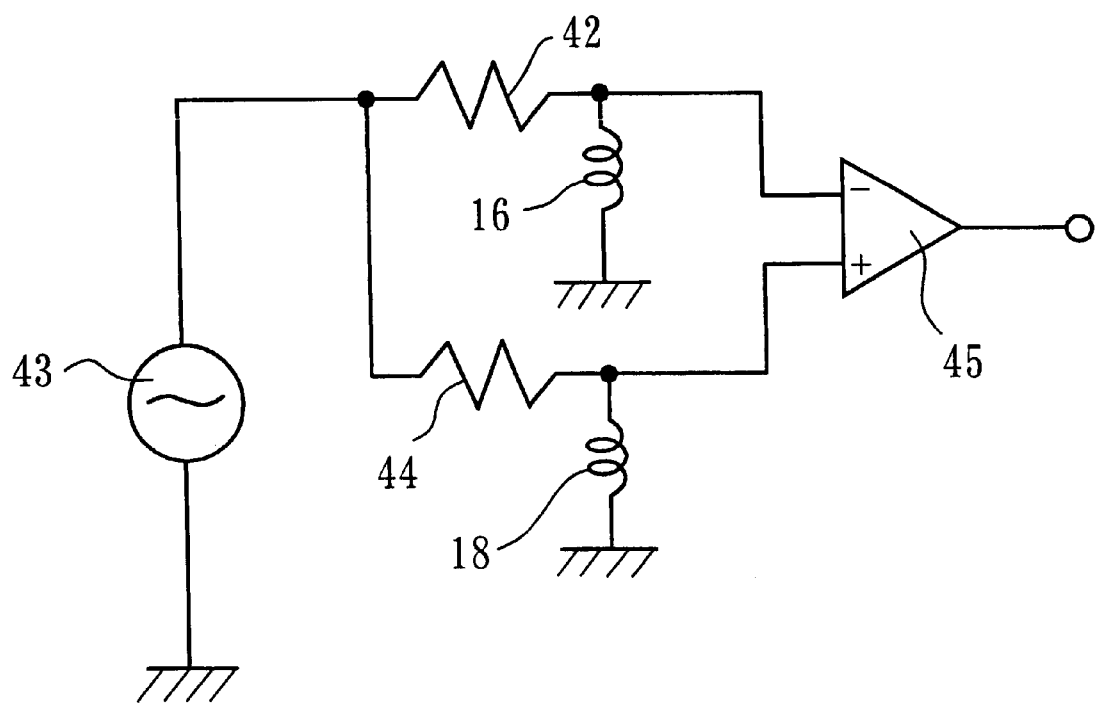
FIG. 3 is a view showing one example of the torque sensor detection circuit of the electric power steering device of an embodiment of the present invention.

A first detecting tube (first magnetic flux transmitting member) 13, which is manufactured from magnetic material, is attached via a sleeve 12, which is manufactured from non-magnetic material, to the outer circumference of the input shaft 3 so as to rotate in accompaniment therewith. A third detecting tube (third magnetic flux transmitting member) 15 is attached by press fitting to the outer circumference of the input shaft 3 so as to rotate in accompaniment therewith. A second detecting tube (second magnetic flux transmitting member) 14, which is manufactured from magnetic material, is attached by press fitting to the outer circumference of the output shaft 4 so as to rotate in accompaniment therewith. One end of the first detecting tube 13 faces one end of the second detecting tube 14 with an interval therebetween. The other end of the first detecting tube 13 faces one end of the third detecting tube 15 with an interval therebetween. These ends of the first detecting tube 13, second detecting tube 14, and third detecting tube 15 are constituted by a plurality of teeth 13*a*, 14*a* and 15*a* which are arranged along the circumferential direction. The other end of the first detecting tube 13 is formed as a flat surface. A magnetic flux generating coil is provided inside the sensor housing 2 so as to surround the steering shaft (S). More specifically, a first coil 16 is supported by the first housing 2*a*, which is part of the sensor housing 2, via a first holder 17 which is manufactured from, for example, magnetic material. This first coil 16 constitutes a first magnetic circuit by generating magnetic flux which is transmitted between one end of the first detecting tube 13 and one end of the second detecting tube 14. Additionally, a second coil 18 is supported by the first housing 2*a* via a second holder 19 which is manufactured from magnetic material. This second coil 18 constitutes a second magnetic circuit by generating magnetic flux which is transmitted between the other end of the first detecting tube 13 and one end of the third detecting tube 15. A detection circuit is provided on a circuit board 40 which is mounted on the sensor housing 2. FIG. 3 shows one example of this detection circuit, wherein the first coil 16 is connected to an oscillator 43 via a resistor 42, and also connected to an inverting input terminal of an operational amplifier 45. The second coil 18 is connected to the oscillator 43 via a resistor 44, and is also connected to a noninverting input terminal of the operational amplifier 45. During transmission of the torque through both shafts 3 and 4, the torsion bar 8 twists in response to the torque, whereby the first detecting tube 13 and second detecting tube 14 rotate relatively about the same shaft center axis. As a result of this relative rotation, the area of the region in which the tooth 13*a* of one end of the first detecting tube 13 and the tooth 14*a* of one end of the second detecting tube 14 face each other in the axial direction changes. Thereby, the magnetic resistance to the magnetic flux in the first magnetic circuit changes in response to the amount of elastic relative rotation of the two shafts 3 and 4, which is due to changes in the torque. In response to the change, the output voltage of the first coil 16 changes. Since the first detecting tube 13 and the third detecting tube 15 rotate in accompaniment, there is no variation in the magnetic resistance to the magnetic flux in the second magnetic circuit due to changes in the torque transmitted by the two shafts 3 and 4. When the torque is not being transmitted by the two shafts 3 and 4, the magnetic resistance in the first magnetic circuit becomes equal to the magnetic resistance in the second magnetic circuit. Consequently, a detection circuit is comprised for detecting the torque transmitted by the two shafts 3 and 4 on the basis of the deviation between the changes in the magnetic resistance in the first magnetic circuit and the changes in the magnetic resistance in the second magnetic circuit during transmission of the torque by the two shafts 3 and 4. In other words, the torque transmitted by the steering shaft (S) is detected on the basis of changes in the output of the first coil 16 in response to changes in the relative position in the circumferential direction of the first detecting tube 13 and the second detecting tube 14. Moreover, there is no variation in the magnetic resistance in the second magnetic circuit due to changes in the torque which is transmitted by the two shafts 3 and 4. Thus, output variations of the first coil 16 due, to temperature fluctuations is canceled by the output variations of the second coil 18 due to temperature fluctuations in the operational amplifier 45, meaning that temperature fluctuations in the detected torque can be compensated for.

A worm wheel (driven gear) 10 is provided on the outer circumference of the output shaft 4, and a motor (electric actuator) (M) for generating auxiliary steering power which drives a worm (driving gear) 11 that meshes with this worm wheel 10 is mounted on the second housing 2*b*. More specifically, the output shaft 4 is pressed into the worm wheel 10, and the worm 11 is mounted on the output shaft of the motor (M). As a result, the auxiliary steering power generated by the motor (M), which is driven in response to the torque detected by the torque sensor 1, is transmitted to the steering shaft (S) via the worm 11 and the worm wheel 10, whereby auxiliary steering power is provided.

A receiving portion 51 is provided on the outer circumference of the aforementioned upper shaft 31. In this embodiment, the upper shaft 31 is tubular, and one part thereof, which is positioned on the exterior of the aforementioned sensor housing 2, is a large diameter portion 31a. The inner circumference of a through hole 31a' formed in this large diameter portion 31a serves as the receiving portion 51. A lock member (L), supported by a member fixed to the vehicle body side such as an after-mentioned column 32, is received by the receiving portion 51, whereby the rotation of the steering shaft (S) is restricted to work as an anti-theft function. A well-known device can be used as the operational mechanism of the lock member (L), for example one in which the lock member (L) is inserted into and removed from the through hole 31a' by means of an ignition key switch operation. Consequently, the aforementioned coils 16 and 18 are disposed in a position between the receiving portion 51 and the worm wheel 10, in which the generated magnetic flux is transmitted through the detecting tubes 13, 14 and 15. The outer diameter D1 of the receiving portion 51 and the outer diameter D2 of the worm wheel 10 are made to be larger than the inner diameter D3 of the coils 16 and 18.

The upper shaft 31 and the intermediate shaft 30 are surrounded by a tubular column 32. This column 32 is fitted on the sensor housing 2 by press-fitting, and is thus disposed in an unchanging position with respect to the sensor housing 2. Further, the column 32 is fixed to the vehicle body. The upper shaft 31 is rotatably supported by the column 32 via a ball bearing 33. The outer ring of the bearing 33 is received at one end facing to the vehicle wheel side by a step 32' on the inner circumference of the column 32. The inner ring of the bearing 33 is received at one end facing to the steering wheel (H) side by a snap ring 62 which is fitted into a peripheral groove on the upper shaft 31. Thereby, the column 32 is connected to the upper shaft 31 so as to be capable of accompanying displacement in the axial direction.

Upon manufacture of the aforementioned electric power steering device 1, a first assembly in which the first housing 2a is supported by the first and second coils 16 and 18 via the first and second holders 17 and 19 is formed. Further, a second assembly in which the input shaft 3, to which the first detecting tube 13 and third detecting tube 15 are attached and to which the torsion bar 8 and the intermediate shaft 30 are also attached by the pin 23, is inserted via the bush 25 into the output shaft 4, to which the second detecting tube and the worm wheel 10 are attached, is formed. Here, the output shaft 4 is rotatably supported by the second housing 2b via the ball bearing 6b. Further, the worm wheel 10 and the worm 11 are caused to mesh with each other. The second assembly is inserted from the intermediate shaft 30 side into the first housing 2a of the first assembly through the bearings 6a and 35. In the torque sensor 1, which detects the torque that is transmitted by the steering shaft (S) on the basis of changes in the output of the coil 16 in response to changes in the relative position in the circumferential direction of the first detecting tube 13 and the second detecting tube 14, a detection reference value to detect torque is the output of the coil 16 when torque is zero. The absolute value of this detection reference value varies in accordance with the relative position in the axial direction of the first detecting tube 13 and second detecting tube 14. Therefore, the relative position in the axial direction of the input shaft 3 and output shaft 4 is changed in order to adjust the relative position in the axial direction of the first detecting tube 13 and second detecting tube 14, so that the two detecting tubes 13 and 14 are relatively disposed in a given position in which the output of the first coil 16 when the torque transmitted by the steering shaft (S) is zero becomes the detection reference value. Next, the torsion bar 8 is connected to the output shaft 4 by the pin 24, whereby the input shaft 3 and the output shaft 4 are connected to each other. Then, the second housing 2b is connected to the first housing 2a, thereby constructing the sensor housing 2. In this embodiment, the relative displacement in the axial direction of the input shaft 3 to the housing 2 is restrained by the fact that the outer ring of the ball bearing 6a contacts the first housing 2a, the inner ring thereof contacts the worm wheel 10, the outer ring of the ball bearing 6b contacts the second housing 2b, and the inner ring thereof contacts an outer circumferential step 4' on the output shaft 4. There are no particular limitations on the means for restraining the relative displacement. Thereafter, the intermediate shaft 30 is inserted into the upper shaft 31, which is provided with the receiving portion 51 on its outer circumference, via the serrations 31' and 30', whereby the upper shaft 31 is connected to the input shaft 3 so as to be capable of accompanying rotation and relative displacement in the axial direction. Further, the upper shaft 31 is supported by the column 32 via the ball bearing 33, and the column 32 is connected by the snap ring 62 to the upper shaft 31 so as to be capable of accompanying displacement in the axial direction. The connection between the column 32 and the upper shaft 31 can be made either before or after the connection of the upper shaft 31 and the intermediate shaft 30. The column 32 is attached to the sensor housing 2 by press-fitting, and therefore the column 32 is disposed in an unchanging position relative to the sensor housing 2. In other words, when manufacturing the aforementioned electric power steering device 1, the sensor housing 2, the coils 16 and 18, the mutually connected input and output shafts 3 and 4, the detecting tubes 13, 14 and 15, and the worm wheel 10 are formed into an assembly, whereupon the upper shaft 31, which is provided with the receiving portion 51 on its outer circumference, is connected to the input shaft 3 so as to be capable of accompanying rotation and relative displacement in the axial direction.

According to the above embodiment, the outer diameter D1 of the receiving portion 51 and the outer diameter D2 of the worm wheel 10 are made to be larger than the outer diameter D3 of the coils 16 and 18, and hence this embodiment can respond to such cases as when the receiving portion 51 is provided on the outer circumference of the steering shaft (S) having a large outer diameter, or when the receiving portion 51 is mounted on the steering shaft (S) via a torque limiter in order to improve the anti-theft function. In this case, the sensor housing 2, coils 16 and 18, input shaft 3, output shaft 4, detecting tubes 13, 14, and 15, and worm wheel 10 are formed as an assembly, whereupon the upper shaft 31, provided with the receiving portion 51 on its outer circumference, is connected to the input shaft 3 so as to rotate in accompaniment therewith. Hence, even though both the worm wheel 10 and the receiving portion 51 are unable to pass through the coils 16 and 18, assembling can be performed without enlarging the inner diameter D3 of the coils 16 and 18. Moreover, since the input shaft 3 and the output shaft 4 are connected to each other following adjustment of the relative position in the axial direction of the first detecting tube 13 and second detecting tube 14, the detecting tubes 13 and 14 can be relatively disposed in a given position in which the output of the coil 16 is the reference value. If excessive force acts upon the connecting portion of the input shaft 3 and output shaft 4, the relative disposition of the detecting tubes 13 and 14 fluctuates, causing a deterioration in the accuracy of the torque detection. However, in this embodiment, by making the upper shaft 31 capable of relative displacement in the axial direction with respect to the input shaft 3, excessive force can be prevented from acting on the connecting portion of the input and output shafts 3 and 4. Excessive force can also be prevented from acting on the connecting portion of the input and output shafts 3 and 4 when the column 32, which surrounds the upper shaft 31 and which is disposed in an unchanging position with respect to the sensor housing 2, is connected to the upper shaft 31 so as to be capable of accompanying displacement in the axial direction.

Figure 4:
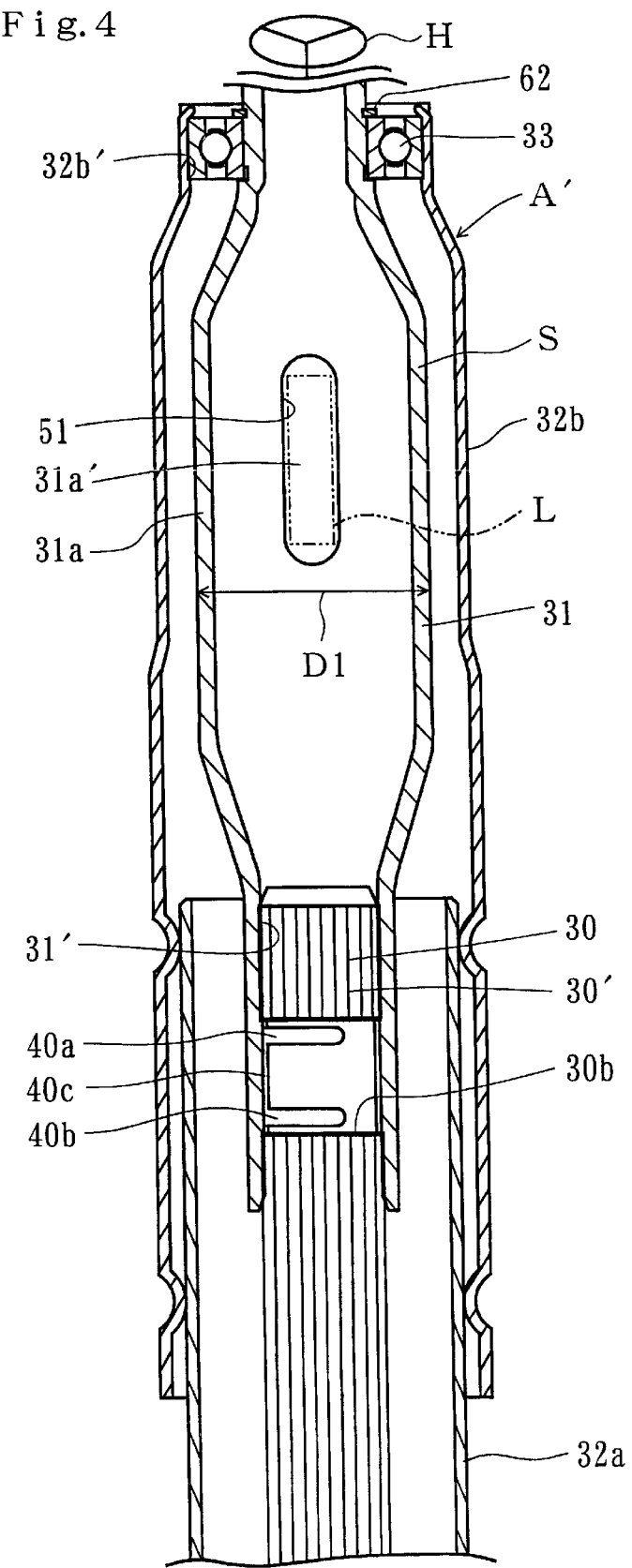
FIG. 4 is a cross-sectional view adjacent to the steering wheel of the electric power steering device of a second embodiment of the present invention.
Figure 5:
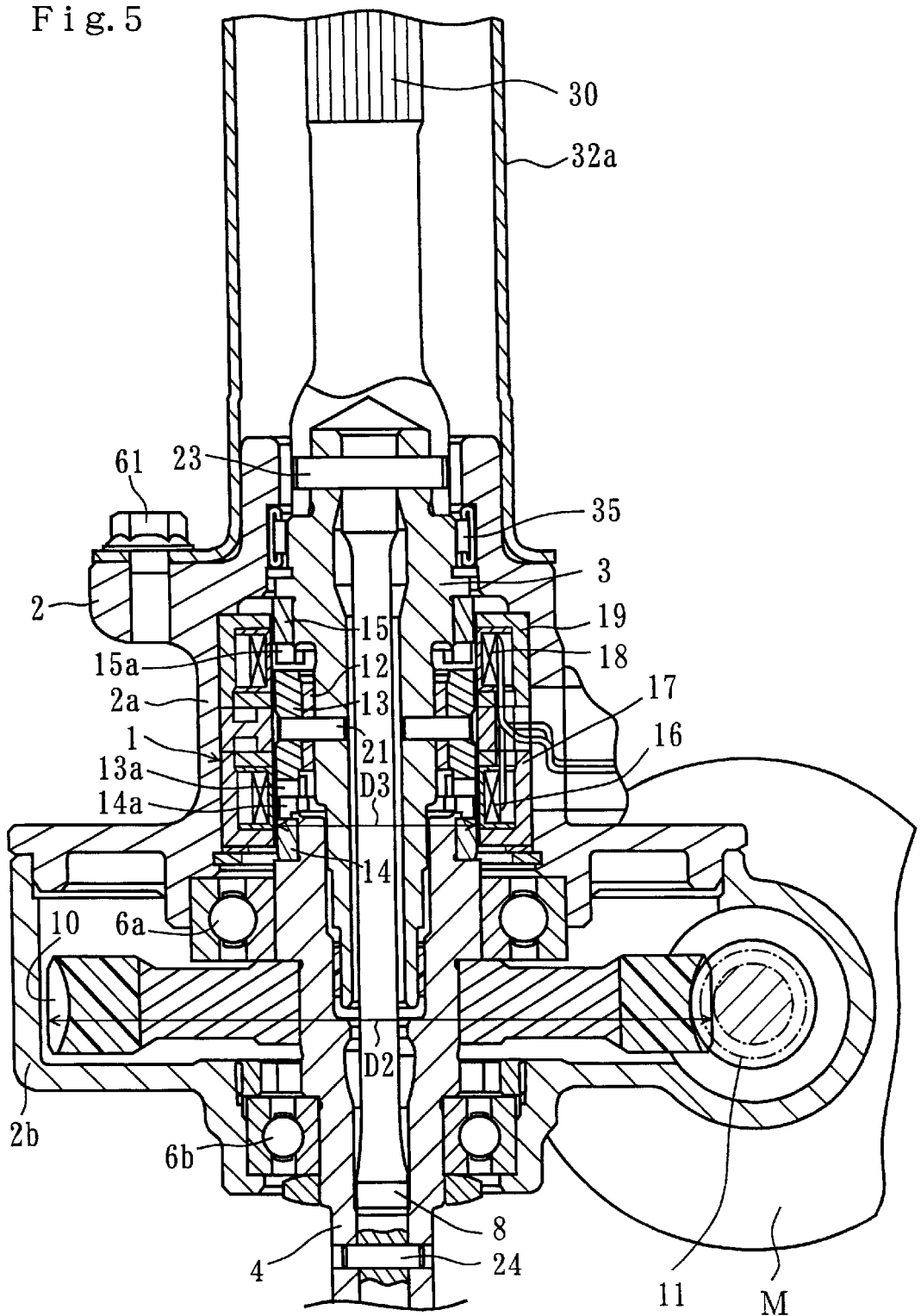
FIG. 5 is a cross-sectional view adjacent to the vehicle wheel of the electric power steering device of a second embodiment of the present invention.
Figure 6:
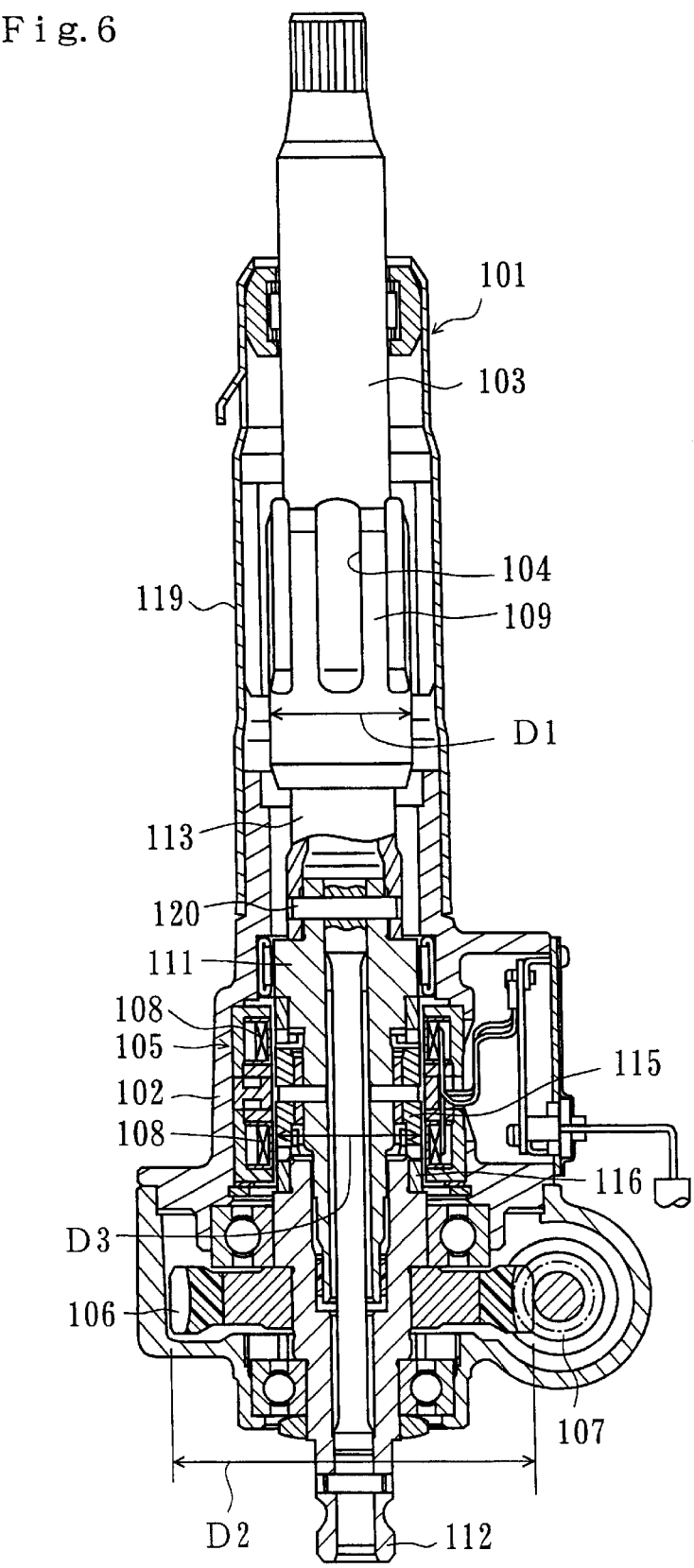
FIG. 6 is a cross-sectional view of a conventional electric power steering device.

FIGS. 4 and 5 show an electric power steering device (A') equipped with an anti-theft function of a second embodiment. This differs from the first embodiment in that an impact absorbing mechanism is provided. That is, in place of the column 32 of the first embodiment, a tubular first column 32a and a tubular second column 32b are provided. The first column 32a is attached to the sensor housing 2 by a bolt 61 and press fitted into the second column 32b, whereby the second column 32b is disposed in an unchanging position with respect to the sensor housing 2. Further, by applying an impact load which is in excess of the press-fitting force, the second column 32b is made capable of relative displacement in the axial direction against the friction between itself and the first column 32a. The steering shaft (S) is rotatably supported by the second column 32b via the ball bearing 33. The outer ring of this bearing 33 is received at one end facing to the vehicle wheel side by a step 32b' on the inner circumference of the second column 32b, whereas the inner ring of the bearing 33 is received at one end facing to the steering wheel (H) side by the snap ring 62, which is fitted over the peripheral groove of the upper shaft 31. Thereby, the second column 32b is connected to the upper shaft 31 so as to be capable of accompanying displacement in the axial direction. The connection between the second column 32b and the upper shaft 31 is performed prior to the connection of the upper shaft 31 to the intermediate shaft 30. When the upper shaft 31 is connected to the intermediate shaft 30 so as to be capable of relative displacement in the axial direction, the second column 32b is connected to the first column 32a, that is, the first column 32a is press-fitted into the second column 32b. Further, the second column 32b is connected to the vehicle body so as to be releasable by impact action, for example, connected by means of a synthetic resin material which break upon impact action. As a result, the impact when a driver collides with the steering wheel (H) causes the second column 32b to be relatively displaced in the axial direction with respect to the first column 32a, and in accompaniment with the second column 32b, causes the upper shaft 31 to be relatively displaced in the axial direction with respect to the intermediate shaft 30, whereby the impact energy is absorbed. Other aspects of this embodiment are similar to the first embodiment.

The present invention is not limited to the aforementioned embodiments. For example, the driving gear and driven gear can be constituted by other gears such as bevel gears or hypoid gears rather than the worm and worm wheel. Further, the third detecting tube and second coil, which serve as the temperature compensating function in the torque sensor, are dispensable. The connection of the upper shaft to the input shaft so as to allow relative displacement in the axial direction is not limited to being via a serration, but can be via a spline or the like. Alternatively, the upper shaft can be formed from a tubular member having an inner circumference with a noncircular transverse cross section, whereby the intermediate shaft has an outer circumference with a noncircular transverse cross section which is inserted into the inner circumference of the upper shaft. The intermediate shaft is dispensable, and the upper shaft can be directly connected to the input shaft. Furthermore, a tubular member formed as a separate entity to the upper shaft can be integrated with the upper shaft on its outer circumference by welding or the like, and the receiving portion can be constituted by the inner surface of a recessed portion or hole formed in this tubular member. Also, a receiving portion formed from a tubular member that is a separate entity to the steering shaft can be provided on the outer circumference of the steering shaft via a torque limiter.

What is claimed is:

1. A manufacturing method for an electric power steering device equipped with an anti-theft function, comprising:
    a sensor housing;
    a steering shaft having a part which is surrounded by the sensor housing; and
    a torque sensor having a magnetic flux generating coil which is provided within the sensor housing so as to surround the steering shaft,
wherein the torque sensor has input and output shafts which constitute said steering shaft and which are mutually so as to be capable of elastic relative rotation;
    the torque transmitted by the steering shaft is detected on the basis of changes in the output of said coil in response to changes in the relative position in the circumferential direction of a first magnetic flux transmitting member which is attached to the input shaft and a second magnetic flux transmitting member which is attached to the output shaft;
    an auxiliary steering power transmitting driven gear is provided on the outer circumference of the output shaft;
    the steering shaft has an upper shaft which is a separate entity to the input and output shafts,
    a receiving portion is provided on the outer circumference of the upper shaft;
    the coil is disposed in a position between the receiving portion and the auxiliary steering power transmitting driven gear, in which the generated magnetic flux is transmitted through the magnetic flux transmitting members; and
    a lock member which is supported by a member fixed to the vehicle body side and which is received by the receiving portion, whereby the rotation of the steering shaft is restricted;
    said manufacturing method being characterized in that, upon manufacture of the electric power steering device, the outer diameter of the receiving portion and the outer diameter of the auxiliary steering power transmitting driven gear are made to be larger than the inner diameter of the coil, and
    the sensor housing, the coil, the mutually connected input and output shafts, the magnetic flux transmitting members, and the driven gear are formed into an assembly, whereupon the upper shaft provided with the receiving portion on the outer circumference thereof is connected to the input shaft so as to be capable of rotation in accompaniment therewith.

2. The manufacturing method for an electric power steering device equipped with an anti-theft function according to claim 1, wherein the two magnetic flux transmitting members are relatively disposed in a given position, whereupon the input shaft and the output shaft are connected to each other, and the upper shaft is connected to the input shaft so as to be capable of relative displacement in the axial direction.

3. The manufacturing method for an electric power steering device equipped with an anti-theft function according to claim 2, wherein a column, which surrounds the upper shaft and which is disposed in an unchanging position with respect to the sensor housing, is connected to the upper shaft so as to be capable of accompanying displacement in the axial direction.

4. An electric power steering device equipped with an anti-theft function, comprising:

a sensor housing;

a steering shaft having a part which is surrounded by the sensor housing; and a torque sensor having a magnetic flux generating coil which is provided within the sensor housing so as to surround the steering shaft, wherein the torque sensor has input and output shafts which constitute said steering shaft and which are mutually connected so as to be capable of elastic relative rotation;

the torque transmitted by the steering shaft is detected on the basis of changes in the output of said coil in response to changes in the relative position in the circumferential direction of a first magnetic flux transmitting member which is attached to the input shaft and a second magnetic flux transmitting member which is attached to the output shaft;

an auxiliary steering power transmitting driven gear is provided on the outer circumference of the output shaft;

the steering shaft has an upper shaft which is a separate entity to the input and output shafts, a receiving portion is provided on the outer circumference of the upper shaft;

a column which surrounds the upper shaft, and which is disposed in an unchanging position with respect to the sensor housing is provided;

this column is connected to the upper shaft so as to be capable of accompanying displacement in the axial direction;

the coil is disposed in a position between the receiving portion and the auxiliary steering power transmitting driven gear in which the generated magnetic flux is transmitted through the magnetic flux transmitting members; and a lock member which is supported by a member fixed to the vehicle body side and which is received by the receiving portion, whereby the rotation of the steering shaft is restricted, said device being characterized in that the outer diameter of the receiving portion and the outer diameter of the auxiliary steering power transmitting driven gear are made to be larger than the inner diameter of the coil, and the upper shaft is connected to the input shaft so as to be capable of accompanying rotation and relative displacement in the axial direction.

* * * * *